(12) United States Patent
Callesen et al.

(10) Patent No.: US 9,835,179 B2
(45) Date of Patent: Dec. 5, 2017

(54) HYDRAULIC VALVE ARRANGEMENT

(71) Applicant: Danfoss Power Solutions ApS, Nordborg (DK)

(72) Inventors: Frede Callesen, Odense S (DK); Dirk Wroblewski, Flensburg (DE)

(73) Assignee: Danfoss Power Solutions ApS, Nordborg (DK)

( * ) Notice: Subject to any disclaimer, the term of this patent is extended or adjusted under 35 U.S.C. 154(b) by 0 days.

(21) Appl. No.: 14/785,887

(22) PCT Filed: Mar. 31, 2014

(86) PCT No.: PCT/EP2014/056476
§ 371 (c)(1),
(2) Date: Oct. 21, 2015

(87) PCT Pub. No.: WO2014/195042
PCT Pub. Date: Dec. 11, 2014

(65) Prior Publication Data
US 2016/0061225 A1  Mar. 3, 2016

(30) Foreign Application Priority Data
Jun. 4, 2013 (EP) ..................................... 13170452

(51) Int. Cl.
*F16K 11/00* (2006.01)
*F15B 11/024* (2006.01)
(Continued)

(52) U.S. Cl.
CPC .......... *F15B 11/024* (2013.01); *F15B 15/149* (2013.01); *F16K 3/0254* (2013.01);
(Continued)

(58) Field of Classification Search
CPC ............ Y10T 137/86574; F15B 11/024; F15B 2011/0243; F15B 2011/0246
See application file for complete search history.

(56) References Cited

U.S. PATENT DOCUMENTS 6,460,621 B2 * 10/2002 Fenton .................. E21B 33/035
166/347
7,040,214 B2 * 5/2006 Cossette ................. E02F 3/965
91/420

(Continued)

FOREIGN PATENT DOCUMENTS

DE    10 2007 029 358 A1    1/2009
DE    10 2009 008367 A1    8/2010

OTHER PUBLICATIONS

International Search Report for PCT Serial No. PCT/EP2014/056476 dated Jun. 18, 2014.

*Primary Examiner* — Seth W Mackay-Smith
(74) *Attorney, Agent, or Firm* — McCormick, Paulding & Huber LLP

(57) ABSTRACT

A hydraulic valve arrangement (1) is provided comprising comprising a supply port arrangement having a high pressure port (2) and a low pressure port (4), a working port arrangement having two working ports (6, 7), a first valve (13) arranged between said high pressure port (2) and said working port arrangement (6, 7), a second valve (14) arranged between said low pressure port (4) and said working port arrangement (6, 7), a controller (19) for controlling said first valve (13) and said second valve (14), said controller (19) having an input connection (20) for receiving a signal of an operator input device, and a regenerative flow path which can be established by means of at least one of said first valve (13) and said second valve (14). The function of such a hydraulic valve arrangement should be enhanced. To this end said controller (19) said controller interrupts said (Continued)

regenerative flow path when a feed pressure at said working port arrangement (6, 7) exceeds a predetermined pressure level.

20 Claims, 1 Drawing Sheet

(51) Int. Cl.
  *F15B 15/14* (2006.01)
  *F16K 3/02* (2006.01)
  *G05D 7/06* (2006.01)
  *G05D 16/20* (2006.01)

(52) U.S. Cl.
  CPC ......... *G05D 7/0652* (2013.01); *G05D 16/204* (2013.01); *F15B 2011/0246* (2013.01); *F15B 2211/30565* (2013.01); *F15B 2211/351* (2013.01); *F15B 2211/353* (2013.01); *F15B 2211/6306* (2013.01); *F15B 2211/6309* (2013.01); *F15B 2211/6313* (2013.01); *F15B 2211/665* (2013.01); *F15B 2211/6654* (2013.01); *F15B 2211/7053* (2013.01); *F15B 2211/761* (2013.01)

(56) References Cited

U.S. PATENT DOCUMENTS

| | | |
|---|---|---|
| 7,243,591 B2 | 7/2007 | Dixen et al. |
| 2005/0072954 A1 | 4/2005 | Nielsen |
| 2009/0288408 A1* | 11/2009 | Tozawa ................ E02F 9/2075 60/435 |

* cited by examiner

HYDRAULIC VALVE ARRANGEMENT

CROSS-REFERENCE TO RELATED APPLICATION

This application is entitled to the benefit of and incorporates by reference subject matter disclosed in the International Patent Application No. PCT/EP2014/056476 filed on Mar. 31, 2014 and European Patent Application Serial No. 13170452 filed Jun. 4, 2013.

TECHNICAL FIELD

The present invention relates to hydraulic valve arrangement comprising a supply port arrangement having a high pressure port and a low pressure port, a working port arrangement having two working ports, a first valve arranged between said high pressure port and said working port arrangement, a second valve arranged between said low pressure port and said working port arrangement, a controller for controlling said first valve and said second valve, said controller having an input connection for receiving a signal of an operator input device, and a regenerative flow path which can be established by means of at least one of said first valve and said second valve.

BACKGROUND

Such a hydraulic valve arrangement is known, for example, from U.S. Pat. No. 7,243,591 B2. The flow from the high pressure port to the working port arrangement (meter-in flow) and the flow from the working port arrangement to the low pressure port (meter-out flow) can basically be controlled independently from each other. When a hydraulic actuator in which the meter-in flow and the meter-out flow are different is connected to the working port arrangement, the difference can be used as regenerative flow.

SUMMARY

An object underlying the invention is to enhance the function of the hydraulic valve arrangement.

This object is solved in a hydraulic valve arrangement as described above in that said controller interrupts said regenerative flow path when a feed pressure at said working port arrangement exceeds a predetermined pressure level.

The control of the hydraulic valve arrangement is simplified. As long as the feed pressure is sufficient, the hydraulic fluid coming back from the actuator to the working port arrangement is used as regenerative flow, i.e. it is added to the flow supplied via the high pressure port. The actuator operates with equal pressures at both working ports provided that there is a difference in the area on which the pressures at the working port acts. However, it is apparent that only the area difference is available to create the force of the actuator. This is no problem, since the controller monitors the feed pressure. When the feed-pressure gets to high due to the load, the controller interrupts said regenerative flow path so that the full feed pressure is available at the working port arrangement. In this case not only the area difference is available for creating the force of the actuator, but also the pressure difference between the two working ports.

In a preferred embodiment a controlled pump flow part from said first valve and a controlled regenerative flow part from said second valve are being joined in a meter-in flow to said working port arrangement. In this way it is possible to ensure a basically load independent actuator control.

Preferably a check valve is arranged in said regenerative flow path. This check valve automatically ensures the correct flow direction. If the feed pressure at one working port exceeds the pressure at the other working port receiving hydraulic fluid from the actuator there is no flow back from the feeding working port to the receiving working port. A regenerative flow is established only in case the feeding pressure is lower or equal to the pressure at the receiving working port.

Preferably said check valve is arranged in a valve element of said first valve or said second valve, respectively, establishing said regenerative flow path. Such a construction does not need additional space to accommodate the check valve.

In a preferred embodiment on the basis of said signal of said operator input device said controller at least initially calculates an unbalance between a first flow demand for said first valve and a second flow demand for said second valve, and adjusts said first valve according to said first flow demand and said second valve according to said second flow demand. In this way the pressure ratio between the two working ports can be adjusted so that optimal working conditions of the actuator connected to the working port arrangement can be reached.

Preferably said second flow demand is higher than said first flow demand. In this way an unintended back-pressure in the actuator is avoided when the regenerative flow is established and a minimal back-pressure is reached when the regenerative flow path is interrupted.

In a preferred embodiment, depending on a load condition at the working port arrangement, said controller corrects said first flow demand and/or said second flow demand. In some cases it may be sufficient to have a constant difference between the first flow demand and the second flow demand. However, in other cases it is preferable to change this difference depending on load conditions or operational conditions.

Preferably said first valve and/or said second valve establishes said regenerative flow path upon movement of a valve element out of a neutral position and interrupts said regenerative flow path when moving said valve element further in the same direction. Such a construction has the advantage that a regenerative flow path is established at the beginning of the operation of the hydraulic valve arrangement. However, if a regenerative operation is not useful under certain conditions, the movement of the valve element just is continued to interrupt the regenerative flow path and to establish meter-out control, i.e. a control of a flow of a hydraulic fluid from the working port arrangement directly to the low pressure port.

Preferably said first valve and/or said second valve are spool valves. A spool valve comprises a spool or slide arranged in a housing. By moving such a spool within the housing, metering areas are increased or decreased or a connection between ports is interrupted. The position of the spool within the housing gives a clear indication of the size of the metering area.

Preferably said controller further opens said first valve, when said regenerative flow path is interrupted. Since the controller is responsible for interrupting the regenerative flow path, it "knows" this condition and can therefore at the same time open further the flow path from the high pressure port to the working port arrangement.

Preferably in case of a negative load at said working port arrangement said controller controls said first valve to ensure a minimum feed pressure level. A negative load is given when the actuator force has the same direction as the motion of the actuator. The feed pressure is typically close to zero. This has the risk of cavitation. The minimum feed pressure level avoids that cavitation effect.

BRIEF DESCRIPTION OF THE DRAWINGS

A preferred embodiment of the invention will now be described in more detail with reference to the drawing, wherein.

DETAILED DESCRIPTION

Figure 1:
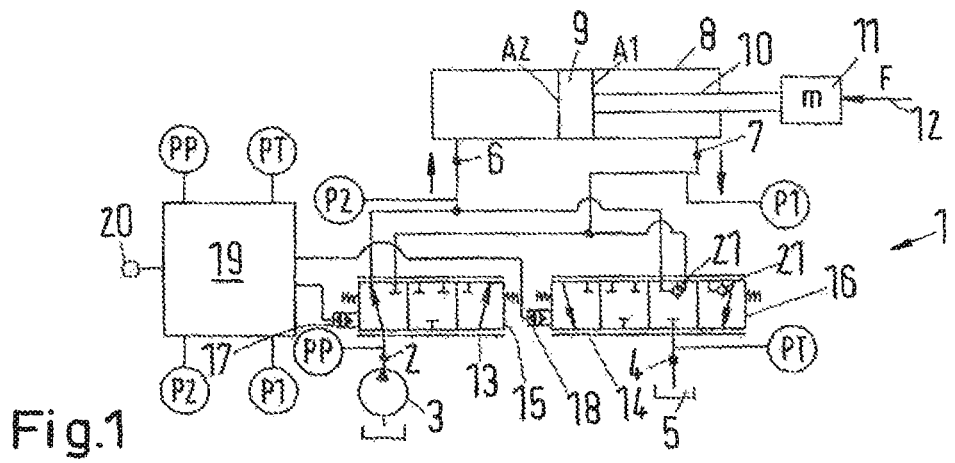
FIG. 1 is a diagrammatic illustration of a hydraulic valve arrangement having a regenerative flow path.

A hydraulic valve arrangement 1 comprises a supply port arrangement having a high pressure port 2 connected to a pressure source in the form of a pump 3 and a low pressure port 4 connected to a tank 5. Furthermore, the valve arrangement 1 comprises a working port arrangement having two working ports 6, 7. The working ports 6, 7 are connected to a hydraulic actuator 8. The hydraulic actuator 8 is shown in the form of a differential cylinder having a piston 9 which is connected to a piston rod 10 which is arranged only on one side of the piston 9. Due to the single sided piston rod 10, the piston 9 shows two pressure areas A1, A2, wherein the pressure area A2 is larger than the pressure area A1.

A load 11 is shown to be connected to the piston rod 10 and a force F acts in a direction of an arrow 12.

A first valve 13 is arranged between the high pressure port 2 and the working port arrangement 6, 7. A second valve 14 is arranged between the working port arrangement 6, 7 and the low pressure port 4. These valves 13, 14 are in the form of spool valves, the first valve 13 having a first spool 15 and the second valve 14 having a second spool 16. Both spools 15, 16 are held in a neutral position by means of springs or the like. In the neutral position a connection between the high pressure port 2 and the working port arrangement 6, 7 or the working port arrangement 6, 7 and the low pressure port 4, respectively, is interrupted.

The first spool 15 is driven by a first spool drive 17. The second spool 16 is driven by a second spool drive 18. The two spool drives 17, 18 are connected to a controller 19. The controller 19 controls the position of the spools 15, 16 of the valves 13, 14. In a preferred embodiment such a spool drive 17, 18 is an electrohydraulic drive acting by means of a pilot pressure.

The controller comprises a connection 20 for receiving a signal of an operator input device, for example, a joystick or the like. The signal of this operator input device defines, how the actuator 8 is operated. The direction of the movement of the operator 8 is determined by the position of the spools 15, 16 of the valves 13, 14.

A number of pressure sensors is provided. A pressure sensor PP is arranged to detect the pressure near the high pressure port 2. A pressure sensor PT is arranged to detect the pressure near the low pressure port 4. A pressure sensor P1 is arranged to detect the pressure at the working port 7, and a pressure sensor P2 is arranged to detect a pressure near the working port 6. All pressure sensors PP, PT, P1, P2 are connected to the controller 19.

In the present embodiment, the first valve 13 is a three way valve. However, this could of course also be any random valve type. In a neutral position of the first spool 15 a connection between the high pressure port 2 and the working port arrangement 6, 7 is interrupted, as mentioned above. In the position of the first spool 15 shown in FIG. 1 a connection between the high pressure port 2 and the working port 6 is established. In the third position of the first spool 15 a connection between the high pressure port 2 and the other working port 7 is established.

In the present embodiment, the second valve 14 is a four-way-valve. However, again this could of course also be any random valve type. In a neutral position of the second spool 2 a connection between the working port arrangement 6, 7 and the low pressure port 4 is interrupted, as mentioned above. In a first position of the second spool 16 a regenerative flow path is established connecting the two working ports 6, 7 and separating the working ports 6, 7 from the low pressure port 4. A check valve 21 is arranged in this regenerative flow path allowing a flow only from the working port 7 to the other working port 6. This first position (regenerative position) is arranged aside the neutral position. In other words when the second spool 16 is moved out of the neutral position in one direction, the regenerative flow path is established, as shown in FIG. 1.

When the second spool 16 is moved further, a connection between the working port 7 and the low pressure port 4 is established. Since the pressure at the low pressure port 4 is much lower than every other pressure in the valve arrangement, the check valve 21 closes and interrupts the regenerative flow path.

To simplify the following explanation, the flow of hydraulic fluid out of the hydraulic valve arrangement 1 into the actuator 8 is called "meter-in flow". The flow from one working port 7 to the other working port 6 is called "regenerative flow" and the flow from the actuator 8 to the valve arrangement 1 and to the low pressure port 4 is called "meter-out flow".

The input signal from the operators input device arriving at the connection 20 represents the meter-in flow and gets converted by the controller 19 in a flow demand for both valves 13, 14 separately. The cylinder ratio A1/A2 of the actuator 8 determines the flow demand for the regenerative flow based on the demanded meter-in flow. The required pump flow is than the difference between meter-in flow and regenerative flow. According to the measured pressure drop across the metering edges and according to the known metering area of the two valves 13, 14, the spool positions of the spools 15, 16 gets always adjusted in order to meet the given flow demand from the controller 19. The demanded regenerative flow is slightly higher than the demanded meter-in flow. This unbalance avoids unintended back-pressure in the actuator 8 but still enables the operator to control the actuator speed for both positive and negative actuator forces.

As mentioned above, positive load is given when the actuator force F counteracts the motion of the actuator 8. The feed pressure P2 reflects the sum of actuator force F plus line and metering losses $((P1-P2) \times A2)$. The sum of forces relates to the rod area $(A2-A1)$.

The flow control at the second spool 16 (also referred to as "T-spool") demands slightly higher regenerative flow than the demanded meter-in flow into the actuator 8 $(Qin < Qregen \times A2/A1)$. The flow balance of the actuator 8 is disturbed and lowers the back-pressure P1 partially. The metering loss $(P1-P2)$ shrinks between regenerative line and meter-in line. The back-pressure is still higher than the feed pressure due to bounded flow direction caused by the check valve 21.

The lowered pressure drop $(P1-P2)$ requires a wider opening of the metering area in order to maintain the demanded regenerative flow. The continued flow unbalance lets sink the pressure drop (P1–P2) even more which again forces the second spool 16 to open more. This sequence continues until the second spool 16 reaches and separates at its maximum regenerative metering position. Than the second spool 16 does not control any longer the regenerative flow; for keeping the demanded flow a much higher opening would be required which cannot be provided due to the fact that the spool saturates. The actual regenerative flow lowers until it meets the flow equilibrium of the actuator. The regenerative flow is determined by the actuator displacement, the metering area is constant, and thus the pressure drop (P1–P2) is a function of the actuator velocity.

The flow through the first spool 15 (pump flow contribution) determines the velocity of the actuator. The regenerative flow reflects the actuator displacement.

As long as the regenerative flow path is established and the pressure P1 is equal or slightly higher than the pressure P2, the actuator force results from the difference between the two areas A1, A2 of the piston 9. In other words, the force is determined by the area of the rod 10 which is relative small. Depending on the force F counteracting the movement of the actuator 8, a reasonable pressure for such positive forces is required. As the maximum achievable pump pressure is limited, it is obvious that the actuator force capability is also limited with the regenerative flow path established.

In order to overcome this dilemma, the controller 19 monitors the feed pressure PP. When the feed-pressure PP gets to high due to the load, the controller 19 shifts the metering principle from regenerative metering to independent metering. To this end, the second spool 16 is moved further to interrupt the regenerative flow path and to establish a connection between the working port 7 and the low pressure port 4. The meter-out line gets drained and the back-pressure P1 sinks below the feed pressure P2. That is the trigger for the build-in check valve 21 to close the regenerative circuit. The check-valve 21 is controlling the hydraulic fluid that must flow to the working port 6 or to the tank port 4 in the switching moment. The check valve 21 does not close until pressure P1 is below the pressure P2. Then the valve arrangement 1 acts as independed metering system to the actuator 8.

As the second spool 16 moves further out to the tank metering area, the flow through the first spool 15 has to be increased concurrently in order to compensate for the missing regenerative flow contribution. The first spool 15 increases the pump flow until it matches the operator demanded meter-in flow.

The flow control at the second spool 16 demands slightly higher meter-out flow than the first spool 15 would meter into the actuator. The meter-in/meter-out flow balance of the actuator 8 is disturbed and lowers the back-pressure P1. The lowered back-pressure P1 requires a wider opening of the second spool 16 in order to maintain the demanded flow through the second valve 14. This sequence continues till the second spool 16 reaches its maximum spool position. Due to the spool saturation the actual flow through the second valve 14 lowers until it meets the meter-in/meter-out flow equilibrium of the actuator 8. The controller corrects the first flow demand and/or the second flow demand.

The first valve 13 determines the velocity of the actuator 8. The feed pressure P2 reflects the actuator force F and the back pressure P1. The back-pressure P1 is minimal.

Figure 2:
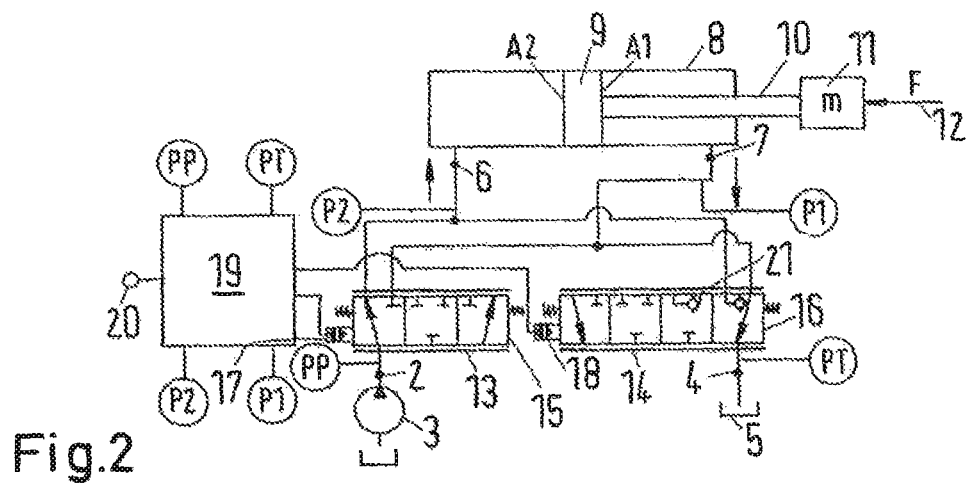
FIG. 2 is a diagrammatic illustration of the valve arrangement having the regenerative flow path interrupted.

The transition between the regenerative flow control and the meter-in flow control is shown by the difference between FIGS. 1 and 2. In all figures the same elements are designated with the same numerals.

Figure 3:
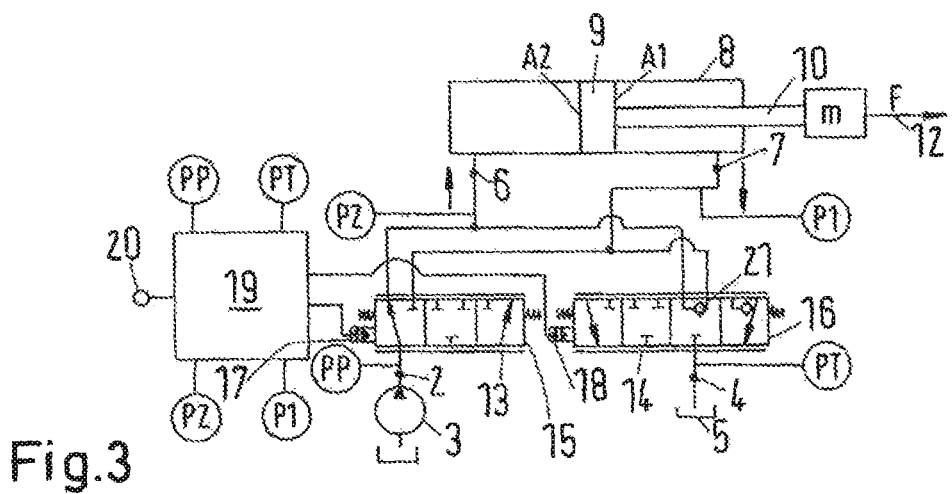
FIG. 3 is a diametric illustration of the valve arrangement with a negative load.

FIG. 3 shows a negative low scenario.

Negative load is given, when the actuator force F has the same direction as the motion of the actuator 8. The feed-pressure P2 is typically close to zero. The back-pressure P1 reflects the actuator force F and the sum of throttling losses in the line between the actuator and the second valve 14 plus the losses across regenerative metering area itself in the second valve 14.

The flow control at the second valve 14 demands slightly higher regenerative flow than the demanded meter-in flow into the actuator 8 (Qin<Qregen×A2/A1). As there is sufficient pressure drop across the regenerative metering area the second spool 16 will settle to a particular spool position where the regenerative flow matches the flow demand. Due to negative actuator force the back pressure P1 will not sink and the unbalanced flow equilibrium at the actuator is the reason for the lowering of the feed-pressure. The feed-pressure P2 would settle to values below zero as the actuator 8 displaces more fluid volume than provided by the meter-in flow due to the higher regenerative flow. The avoidance of that cavitation effect is subject of an additional function.

The anti-cavitation function ensures a minimum feed-pressure level. The controller 19 monitors the feed pressure P2 and demands more pump flow when the feed-pressure P2 drops below a defined level, i.e. anti-cavitation pressure. By providing more pump flow than initially demanded by the flow control, the flow equilibrium at the actuator 8 is balanced and the feed-pressure stops lowering. When the anti-cavitation pressure is reached the additional pump flow demand is going to be reduced gradually until the initial flow demand by the controller 19 remains. So the anti-cavitation function is always present in the background and when the feed-pressure P2 drops below cavitation critical levels it provides more pump flow to the actuator 8. Positive actuator forces with higher feed pressure will not have an impact to that function.

In the negative load scenario the regenerative flow determines the velocity of the actuator. The feed-pressure P2 settles on its minimum level (anti-cavitation pressure).

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A hydraulic valve arrangement comprising:
   a supply port arrangement having a high pressure port and a low pressure port;
   a working port arrangement having two working ports;
   a first valve arranged between said high pressure port and said working port arrangement;
   a second valve arranged between said low pressure port and said working port arrangement;
   a controller for controlling said first valve and said second valve, said controller having an input connection for receiving a signal of an operator input device; and
   a regenerative flow path established by means of said first valve and/or said second valve;
   wherein said controller interrupts said regenerative flow path when a feed pressure at said working port arrangement exceeds a predetermined pressure level; and
   wherein on the basis of said signal of said operator input device, said controller at least initially calculates an unbalance between a first flow demand for said first valve and a second flow demand for said second valve, and adjusts said first valve according to said first flow demand and said second valve according to said second flow demand.

2. The hydraulic valve arrangement according to claim 1, wherein a controlled pump flow part from said first valve and a controlled regenerative flow part from said second valve are joined in a meter-in flow to said working port arrangement.

3. The hydraulic valve arrangement according to claim 2, wherein a check valve is arranged in said regenerative flow path.

4. The hydraulic valve arrangement according to claim 2, wherein on the basis of said signal of said operator input device, said controller at least initially calculates an unbalance between a first flow demand for said first valve and a second flow demand for said second valve, and adjusts said first valve according to said first flow demand and said second valve according to said second flow demand.

5. The hydraulic valve arrangement according to claim 2, wherein said first valve and/or said second valve establishes said regenerative flow path upon movement of a valve element out of a neutral position and interrupts said regenerative flow path when moving said valve element further in the same direction.

6. The hydraulic valve arrangement according to claim 1, wherein a check valve is arranged in said regenerative flow path.

7. The hydraulic valve arrangement according to claim 6, wherein said check valve is arranged in a valve element of said first valve or said second valve, establishing said regenerative flow path.

8. The hydraulic valve arrangement according to claim 7, wherein on the basis of said signal of said operator input device, said controller at least initially calculates an unbalance between a first flow demand for said first valve and a second flow demand for said second valve, and adjusts said first valve according to said first flow demand and said second valve according to said second flow demand.

9. The hydraulic valve arrangement according to claim 7, wherein said first valve and/or said second valve establishes said regenerative flow path upon movement of a valve element out of a neutral position and interrupts said regenerative flow path when moving said valve element further in the same direction.

10. The hydraulic valve arrangement according to claim 6, wherein on the basis of said signal of said operator input device, said controller at least initially calculates an unbalance between a first flow demand for said first valve and a second flow demand for said second valve, and adjusts said first valve according to said first flow demand and said second valve according to said second flow demand.

11. The hydraulic valve arrangement according to claim 6, wherein said first valve and/or said second valve establishes said regenerative flow path upon movement of a valve element out of a neutral position and interrupts said regenerative flow path when moving said valve element further in the same direction.

12. The hydraulic valve arrangement according to claim 1, wherein said first valve and/or said second valve establishes said regenerative flow path upon movement of a valve element out of a neutral position and interrupts said regenerative flow path when moving said valve element further in the same direction.

13. The hydraulic valve arrangement according to claim 1, wherein said second flow demand is higher than said first flow demand.

14. The hydraulic valve arrangement according to claim 13, wherein, depending on a load condition at the working port arrangement, said controller corrects said first flow demand and/or said second flow demand.

15. The hydraulic valve arrangement according to claim 1, wherein, depending on a load condition at the working port arrangement, said controller corrects said first flow demand and said second flow demand.

16. The hydraulic valve arrangement according to claim 1, wherein said first valve and/or said second valve are spool valves.

17. The hydraulic valve arrangement according to claim 1, wherein in case of a negative load at said working port arrangement, said controller controls said first valve to ensure a minimum feed pressure level.

18. The hydraulic valve arrangement according to claim 1, further comprising a pressure sensor connected to the controller, the pressure sensor sensing the feed pressure at the working port arrangement;

wherein, when the pressure sensor senses that said feed pressure at the working port arrangement exceeds the predetermined pressure level, the controller interrupts the regenerative flow path by means of the first valve and/or the second valve.

19. A hydraulic valve arrangement comprising:
a supply port arrangement having a high pressure port and a low pressure port;
a working port arrangement having two working ports;
a first valve arranged between said high pressure port and said working port arrangement;
a second valve arranged between said low pressure port and said working port arrangement;
a controller for controlling said first valve and said second valve, said controller having an input connection for receiving a signal of an operator input device; and
a regenerative flow path established by means of said first valve and/or said second valve;
wherein said controller interrupts said regenerative flow path when a feed pressure at said working port arrangement exceeds a predetermined pressure level; and
wherein said first valve and/or said second valve establishes said regenerative flow path upon movement of a valve element out of a neutral position and interrupts said regenerative flow path when moving said valve element further in the same direction.

20. A hydraulic valve arrangement comprising:
a supply port arrangement having a high pressure port and a low pressure port;
a working port arrangement having two working ports;
a first valve arranged between said high pressure port and said working port arrangement;
a second valve arranged between said low pressure port and said working port arrangement;
a controller for controlling said first valve and said second valve, said controller having an input connection for receiving a signal of an operator input device; and
a regenerative flow path established by means of said first valve and/or said second valve;
wherein said controller interrupts said regenerative flow path when a feed pressure at said working port arrangement exceeds a predetermined pressure level; and
wherein said controller further opens said first valve when said regenerative flow path is interrupted.

* * * * *